Oct. 14, 1924.
C. JONES ET AL
ANIMAL TRAP
Filed Feb. 3, 1923
1,511,614
2 Sheets—Sheet 2
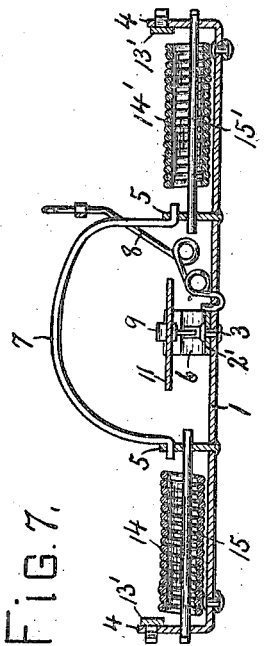
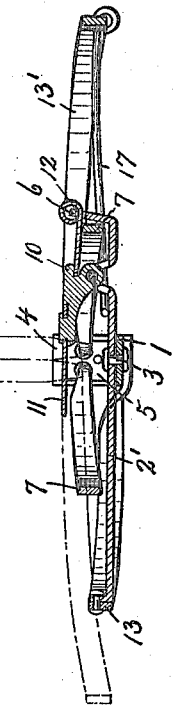
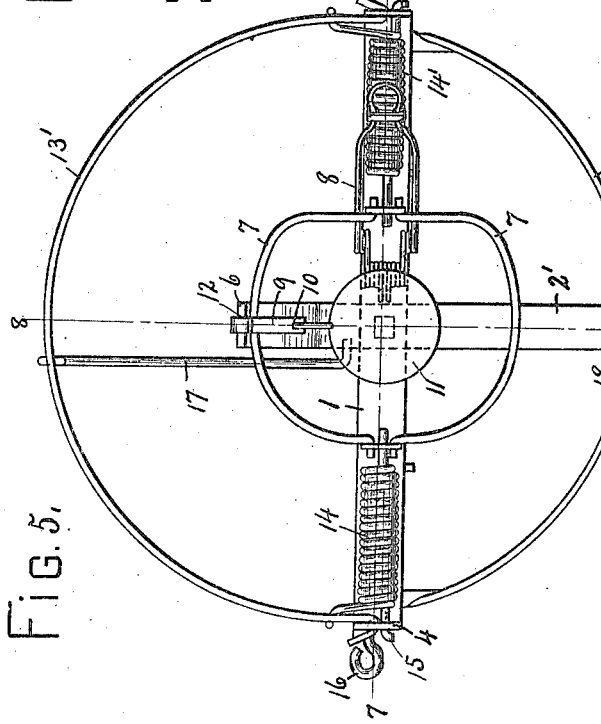

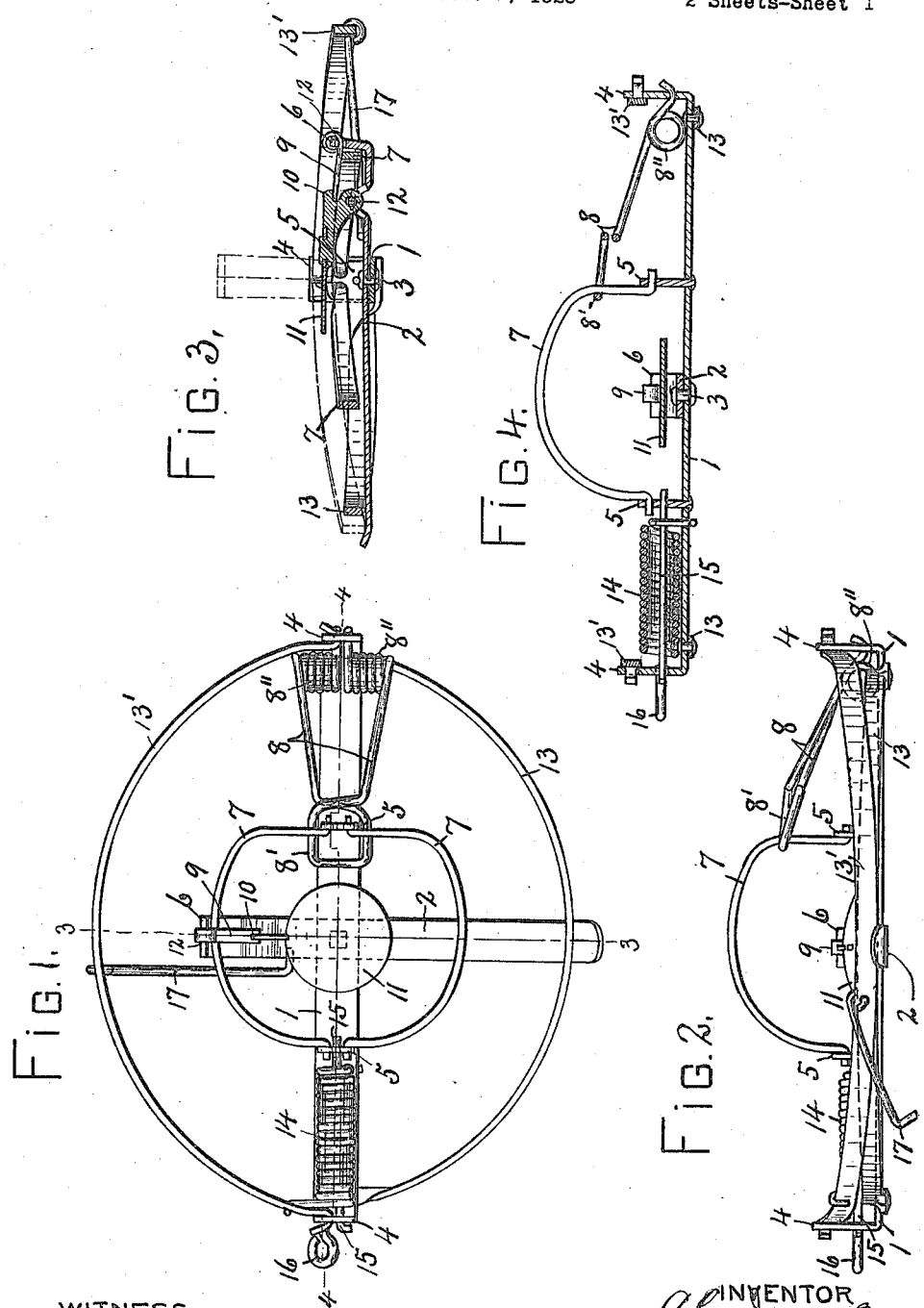

Patented Oct. 14, 1924.

1,511,614

UNITED STATES PATENT OFFICE.

ALLAN C. JONES AND JERAMIAH O'NEIL, OF ONEIDA, NEW YORK, ASSIGNORS TO ONEIDA COMMUNITY, LIMITED, OF ONEIDA, NEW YORK, A CORPORATION OF NEW YORK.

ANIMAL TRAP.

Application filed February 3, 1923. Serial No. 616,697.

*To all whom it may concern:*

Be it known that we, ALLAN C. JONES and JERAMIAH O'NEIL, citizens of the United States of America, of Oneida, in the county of Madison, in the State of New York, have invented new and useful Improvements in Animal Traps, of which the following, taken in connection with the accompanying drawings, is a full, clear, and exact description.

This invention relates to an animal trap involving the use of a primary trap and a relatively larger secondary trap both mounted upon a suitable supporting frame to which one of the jaws of the larger trap is fixed while its companion jaw is movable through an arc of substantially 180 degrees in opening and closing.

The object is to cause the larger jaws to close in a plane at substantially right angles to that of the smaller jaws for the purpose of striking and catching the head or body of the animal with sufficient force to produce practically instantaneous execution while held by the leg or legs in the smaller trap and at the same time to throw the animal into a more or less cramped position to reduce its liability of escape from either set of jaws.

Another object is to hold the movable larger jaw in its open position against the action of its retracting spring by means of a detent controlled by one of the jaws of the smaller trap so that the release of the smaller jaws by the animal will cause an instantaneous release of the larger jaws.

A further object is to assemble the primary and secondary traps upon the frame in such manner that the actuating springs may be placed between the corresponding ends of the jaws of both traps and therefore, wholly within the ends of the jaws of the larger trap.

Other objects and uses relating to specific parts of the trap will be brought out in the following description.

In the drawings:

Figures 1 and 2 are respectively a top plan and a side elevation of a double trap embodying the various features of our invention, the jaws being shown in their open positions in Figure 1 and in closed position in Figure 2.

Figures 3 and 4 are sectional views taken respectively on lines 3—3 and 4—4, Figure 1, except that the primary jaws are closed in Figure 4.

Figures 5 and 6 are respectively a top plan and a side elevation of a slightly modified form of trap, the jaws being open in Figure 5 and closed in Figure 6.

Figures 7 and 8 are sectional views taken respectively on line 7—7 and 8—8, Figure 5 except that the primary jaws are closed in Fig. 7.

As illustrated, the frame for supporting the jaws, comprises a lengthwise bar —1— and a cross bar —2— secured to the lengthwise bar substantially midway between its ends by means of a rivet —3—, the opposite ends of the bar —1— being provided with up-turned ears or lugs —4— and a pair of intermediate lugs —5— in longitudinally spaced relation while one end of the cross bar —2— is provided with an up-turned lug —6— some distance to one side of the lengthwise bar —1— and has its opposite end extended laterally.

A pair of primary jaws —7— are hinged to and between the lugs —5— to swing about horizontal parallel axes and are adapted to be closed by a spring —8— having one end interlocked with one of the lugs —4— and its other end provided with a loop —8'— adapted to pass over the corresponding lug —5— and to engage the lower or outer end edges of the adjacent portions of the jaws —7— to exert closing pressure thereon when released, said spring being preferably made of wire and having its intermediate portion provided with coils —8''— to give additional resiliency and force to the free end of the spring and at the same time to reduce liability of breakage.

A detent —9— is pivoted to the lug —6— of the cross bar —2— to swing to and from a position over the adjacent jaw —7— and is adapted to engage a shoulder —10— on the heel of a bait pan —11— which is pivoted at —12— to an upwardly pressed portion of the cross bar —2— for holding the primary jaws open against the action of the spring —8— when the trap is set.

A pair of relatively larger secondary jaws —13— and —13'— are mounted upon the frame, the jaw —13— being fixed with relation to the frame by having its ends riveted or otherwise secured thereto and normally holding the jaw in a substantially horizontal plane or approximately parallel with that of the cross bar —2—, the other jaw —13'— having its ends pivoted to the lugs —4— at both the ends of the fixed jaw to swing to and from the fixed jaw —13— through an arc of substantially 180 degrees from a position at one side to a position at the opposite side of the primary jaws so as to close in a plane at substantially right angles to the closing plane of the primary jaws —7— and thereby to cramp the animal at one side when caught at the center.

This jaw —13'— is forced to its closed position by means of a coil spring —14— extending lengthwise of the bar —1— and having one end interlocked therewith and its other end engaging the lower or outer edge of the jaw as shown in Figures 1 and 2.

A pin —15— is inserted lengthwise through the coil —14— and through registering apertures in the corresponding lugs —4— and —5— to hold the spring against lateral displacement.

A suitable eye —16— is swiveled to one of the lugs —4— for attachment to a chain or other anchoring device not shown but which permits the relative turning movement of the trap and anchorage to prevent twisting strains upon either of those parts.

It will be observed that both of the springs —8— and —14— extend lengthwise of the frame bar —1— wholly within the ends of the larger secondary jaws —13— —13'— or mainly between the opposite ends of the primary jaws —7— and the corresponding ends of the jaws —13— and —13'— thereby securing a greater compactness and also greater efficiency in the operation of the jaws.

The movable jaw —13'— is held in its open position against the action of its retracting spring —14— by means of a detent —17— having one end hinged to said jaw and its other end extended under the adjacent open jaw —7— and supported upon a portion of the frame preferably upon the upper face of the cross bar —2— so that when the trap is set, the closing of the jaw —13'— is dependent upon and therefore controlled by the adjacent primary jaw —7—.

In the trap shown in Figures 5 to 8 inclusive, the outer end of the cross bar as —2'— which supports the fixed jaw —13— is provided with an up-turned lug —18— to which the central portion of the jaw —13— is secured by a rivet —19— or equivalent fastening means so that this jaw may become a part of the frame.

The movable jaw —13'— while similar to that previously described is of considerably greater radius than that of the jaw —13— so that its central portion may close a corresponding distance beyond the outer face of the fixed jaw to more effectively catch and hold the body of the animal and thereby to produce more instantaneous execution while the leg or legs of the animal are caught in the smaller trap.

Owing to this increased radius of the movable jaw —13'— it becomes necessary to apply additional force or power for closing the same in order to render the instantaneous execution of the animal more certain and for this purpose is provided two of the coil springs —14— and —14'— extending lengthwise of the trap between the ends of the primary jaws —7— and corresponding ends of the secondary jaw —13'— while the spring —8— for closing the primary jaws —7— is preferably attached at one end to the frame bar —1—, at a point between said jaws and has its opposite end extended under or across the outer edges of one end of the primary jaws in the direction of length of the frame for exerting closing pressure thereon.

Otherwise, the construction is similar to that shown in Figures 1 to 4 inclusive.

Operation.

In setting the trap, the spring —8— is first depressed by hand to enable the primary jaws —7— to be opened and locked in their open position by the detent —9— and bait pan —11— after which the jaw —13'— is swung by hand to its open position against the action of its retracting spring —14— and is locked in its open position by swinging the detent —17— under the adjacent jaw —7— and resting its inner end upon the upper face of the cross bar —2— whereby the jaw —13'— is placed under tension of the spring —14— thereby yieldingly holding the detent —17— against the underside of the adjacent jaw —7— until the jaws —7— are released by the tripping of the detent —9— through the engagement of the animal's foot or leg with the bait pan —11— at which time the primary jaws will be closed by the spring —8— and allow the larger jaw —13'— to be closed by its spring —14— to catch the animal around the body while one or more of its legs will be caught between the primary jaws.

We claim:

1. In an animal trap, a frame and a pair of spring-actuated primary jaws pivoted thereto, in combination with a secondary jaw pivoted to the frame beyond the opposite ends of the primary jaws to swing from a position at one side to a position at the opposite side and in the direction of movement of the primary jaws, a coil spring between one end of the secondary jaw and the corresponding ends of the primary jaws for operating said secondary jaw and releasable means for setting the jaws in their open positions.

2. In an animal trap, a frame, a pair of spring-actuated primary jaws pivotally mounted on the frame, a relatively larger secondary jaw pivotally mounted on the frame at opposite ends of the primary jaws in spaced relation thereto, coil springs for closing said secondary jaw mounted on the frame between the ends of the primary jaws and the corresponding ends of the secondary jaw and means releasable by an animal for holding the jaws in their open positions.

3. In an animal trap, a frame and a pair of spring-actuated primary jaws pivoted thereto, in combination with a spring-actuated secondary jaw pivoted to the frame to swing about an axis parallel with the axes of the primary jaws, and releasable means for holding said jaws in their open positions including a detent pivoted to the secondary jaw and extended under one of the open primary jaws and engaged with the frame.

4. In an animal trap, a frame having a relatively fixed jaw and a pair of spring-actuated primary jaws pivoted thereto to swing toward and from each other, in combination with a spring-actuated secondary jaw pivoted to the frame beyond opposite ends of the primary jaws to swing about an axis parallel with the axes of the primary jaws from a position at one side to a position at the opposite side of said primary jaws, and releasable means for setting the jaws in their open positions.

5. The combination with an animal trap having a frame, and a pair of spring-actuated jaws pivoted thereto to swing toward and from each other, of a fixed jaw secured to the frame at opposite ends of the first named jaws and extending laterally therefrom some distance beyond one of the first named open jaws, a spring-actuated secondary jaw pivoted to the frame at points beyond the opposite ends of the first named jaws and movable from a position at one side to a position at the opposite side of said first named jaws, and releasable means for holding the movable jaws in their open positions.

6. The combination with an animal trap having a frame, a pair of spring-actuated primary jaws pivoted thereto, and means releasable by the animal for holding one of said jaws in its open position, of a secondary jaw pivoted to the frame beyond the opposite ends of the primary jaws to swing about an axis parallel with the axes of said primary jaws, and means controlled by one of the primary jaws for holding the secondary jaw in its open position including a detent pivoted to the secondary jaw.

7. In an animal trap, a frame, a pair of spring-actuated primary jaws pivotally mounted upon the intermediate portion of the frame, a fixed jaw secured to the frame at opposite ends of the primary jaw, a secondary spring-actuated jaw also pivoted to the frame at opposite ends of the primary jaws to swing about an axis parallel with the axes of primary jaws from a position at one side to a position at the opposite side of the primary jaws, means releasable by the animal for holding one of the primary jaws in its open position, and a detent having one end pivoted to the secondary jaw and its other end engaged with the frame, and its intermediate portion engaged by one of the said primary jaws for holding the secondary jaw open until after the primary jaw has been released.

In witness whereof we have hereunto set our hands this 23d day of January 1923.

ALLAN C. JONES.
JERAMIAH O'NEIL.

Witnesses:
JARED E. ALLEN,
ERNEST N. RAUSCHER.